United States Patent [19]
Stächelin et al.

[11] 3,910,736
[45] Oct. 7, 1975

[54] TOOL LOCKING DEVICE WITH TIE RODS, PARTICULARLY FOR PLASTICS INJECTION MOLDING MACHINES

[75] Inventors: Albert Stächelin, Hinwil; Rudolf Krebser, Weesen, both of Switzerland

[73] Assignee: Maschinenfabrik und Giesserei Netstal AG, Switzerland

[22] Filed: June 3, 1974

[21] Appl. No.: 475,994

[30] Foreign Application Priority Data
June 6, 1973 Switzerland.......................... 8157/73

[52] U.S. Cl. ......... 425/137; 425/154; 425/DIG. 45; 425/451.2; 425/DIG. 223
[51] Int. Cl.². B29F 1/06; B30B 15/24; B30B 15/28
[58] Field of Search .......... 425/154, 242, 450, 247, 425/DIG. 221, DIG. 222, DIG. 223, 137, 154, DIG. 45

[56] References Cited
UNITED STATES PATENTS

| | | | |
|---|---|---|---|
| 3,036,337 | 5/1962 | Barnham | 425/DIG. 222 |
| 3,160,919 | 12/1964 | Carter | 425/450 X |
| 3,310,841 | 3/1967 | Hehl | 425/154 |
| 3,577,596 | 5/1971 | Bullard | 425/242 X |
| 3,590,436 | 7/1971 | Akesson | 425/242 |
| 3,729,283 | 4/1973 | Eggenberger et al. | 425/450 |
| 3,736,087 | 5/1973 | Ruegg | 425/154 X |
| 3,825,384 | 7/1974 | Hehl | 425/154 X |

OTHER PUBLICATIONS
Koehring, HPM division, pamphlet, Bulletin 7101, Mt. Gilead, Ohio 43338, all pages.

*Primary Examiner*—J. Howard Flint, Jr.
*Attorney, Agent, or Firm*—McGlew and Tuttle

[57] ABSTRACT

The tie rods have first ends anchored to a base plate, and a first tool support is movable along the tie rods. A second tool support is mounted on the tie rods adjacent the opposite ends thereof, and a toggle type locking mechanism is connected between the base plate and the first tool support and operable to lock the first tool support in closing relation with the second tool support. Respective hydraulic cushions are provided between the second tool support and the opposite ends of the tie rods, and a hydraulic pressure limiting device is connected to a hydraulic line interconnecting the hydraulic cushions. The hydraulic cushions may be provided by pistons on the opposite ends of the tie rods and engaged in respective cylinders. A safety circuit may be provided, including a pressure controller associated with a common connection line and a switch responsive to the travel position of the movable first tool support.

4 Claims, 3 Drawing Figures

TOOL LOCKING DEVICE WITH TIE RODS, PARTICULARLY FOR PLASTICS INJECTION MOLDING MACHINES

FIELD AND BACKGROUND OF THE INVENTION

The present invention relates to a tool-locking device with tie rods, particularly for plastics injection-molding machines, comprising a first tool support movable on the tie rods by means of a locking mechanism bearing against the one tie rod ends and a second tool support bearing against the other tie rod ends.

In known devices of this type, the two tool halves are rigidly connected to each other in any relative position through their supports, the tie rods, the supporting elements of the tie rods, and the locking mechanism. Irregularities of manufacture, shape and size variations due to temperature, as well as the inevitable wear, affect the stresses and the symmetry of the forces acting on the individual component parts in an unfavorable manner. The result is that it is practically impossible to maintain an accurate, predetermined locking force between the tool halves.

SUMMARY OF THE INVENTION

The present invention is directed to a tool locking device of the mentioned type in which the above drawbacks are eliminated and the maintenance of a predetermined locking force between the tool halves is made possible. To this end, the inventive device is characterized in that the second tool support bears against each of the associated tie rod ends through respective hydraulic pressure cushions and all the pressure cushions are associated with a common pressure limiting means. Advantageously, all of the pressure cushions communicate with one another to obtain a pressure equalization. The pressure cushions may be associated with a pressure reducing valve or the pressure producing device may be correspondingly designed to insure the pressure limitation.

Such a backing-up by means of pressure cushions not only permits limiting the back-up pressure to a predetermined value independent of temperature variations and irregularities of manufacture but also makes it possible to equalize the loading of the individual component parts (tool supports, tie rods, etc.) to a mean value and to keep this value constant. The unavoidable shocks occurring at the abutment of the tool halves are attenuated by the pressure cushion.

An object of the invention is to provide an improved tool locking device with tie rods, particularly for plastics injection molding machines.

Another object of the invention is to provide such a device including respective hydraulic cushions interposed between a relatively thick tool support and the adjacent ends of the tie rods.

A further object of the invention is to provide such a tool locking device including pressure limiting means common to all of the hydraulic cushions.

For an understanding of the principles of the invention reference is made to the following description of typical embodiments thereof as illustrated in the accompanying drawings.

DESCRIPTION OF THE PREFERRED EMBODIMENTS

Figure 1:
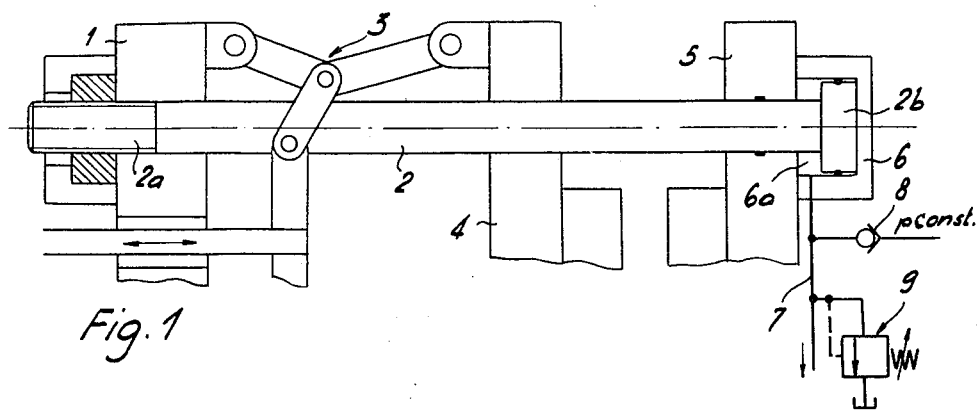
FIG. 1 is a partial plan view, partly in section, of a first embodiment of a tool locking device in accordance with the invention.

The tool supporting mechanisms partly shown in the drawing include a base plate 1 and two horizontal tie rods 2 (only one is shown) which, in a well known manner, bear against, or are anchored to the base plate 1 by one of their end portions 2a. Further, base plate 1 backs up a toggle linkage 3 connected, at the one side, for example, to a hydraulic drive mechanism and, at the other side, to a drivable mold support plate 4. Mold support plate 4 is guided on tie rods 2. The other end portions of the tie rods extend through a second mold support plate 5 and each terminates in a respective piston 2b which is guided in a respective cylinder 6 secured to mold support plate 5. The cylinder spaces 6a, between pistons 2b of each tie rod 2 and mold support plate 5, communicate with each other through a line 7.

In the embodiment shown in FIG. 1, line 7, and thereby the cylinder spaces 6a, are connected through a check valve 8 to a hydraulic pressure source of the machine. Line 7 is further connected to a pressure limiting device, here shown in the form of a pressure relief valve 9. Valve 9 could also be an otherwise controllable valve capable of preventing an exceeding of a predetermined pressure in line 7.

With the machine in operation and the mold open, a pressure cushion is produced in cylinder spaces 6a through check valve 8. During the subsequent closing motion of mold support plate 4, the pressure of the cushions remains constant. As the two mold halves, due to the action of toggle linkage 3, are moved against each other up to a mutual contact, check valve 8 closes and the pressure in the pressure cushions increases. Owing to valve 9 acting as a safety valve, this pressure cannot exceed a predetermined value. The pressure limitation could also be obtained by a corresponding limitation of the drive motion. Connection line 7 insures the same pressure in all of the pressure cushions and in any phase. At the subsequent opening of the mold, the pressure in the pressure cushions drops again to the initial value which is kept constant. Any pressure fluid possibly escaping due to the action of pressure relief valve 9 is refilled through reopened check valve 8, and a new operational cycle may begin.

Figure 2:
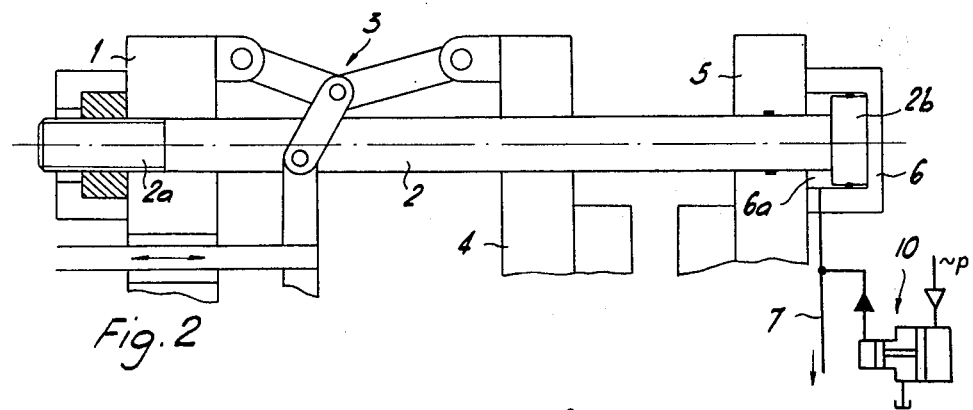
FIG. 2 is a view, similar to FIG. 1, of a second embodiment of the invention.

In the embodiment shown in FIG. 2, the pressure cushions bracing mold support plate 5 against tie rods 2 serve directly to produce the locking force. For this purpose, a piston device 10 is associated with line 7, and can be actuated by the hydraulic system of the machine. In this case again, during the closing motion of mold support plate 4, the pressure in cylinder spaces 6a, i.e. in the pressure cushions, is maintained constant up to the mutual contact of the two mold halves. Thereupon, by actuating piston device 10, the pressure in the pressure cushions is increased to an extent insuring that the mold halves are pressed against each other with a predetermined force. Here again, connection line 7 creates equal pressure conditions in all of the communicating pressure cushions. For opening the mold, the pressure in the pressure cushion is reduced to the initial value by means of the piston device 10.

Figure 3:
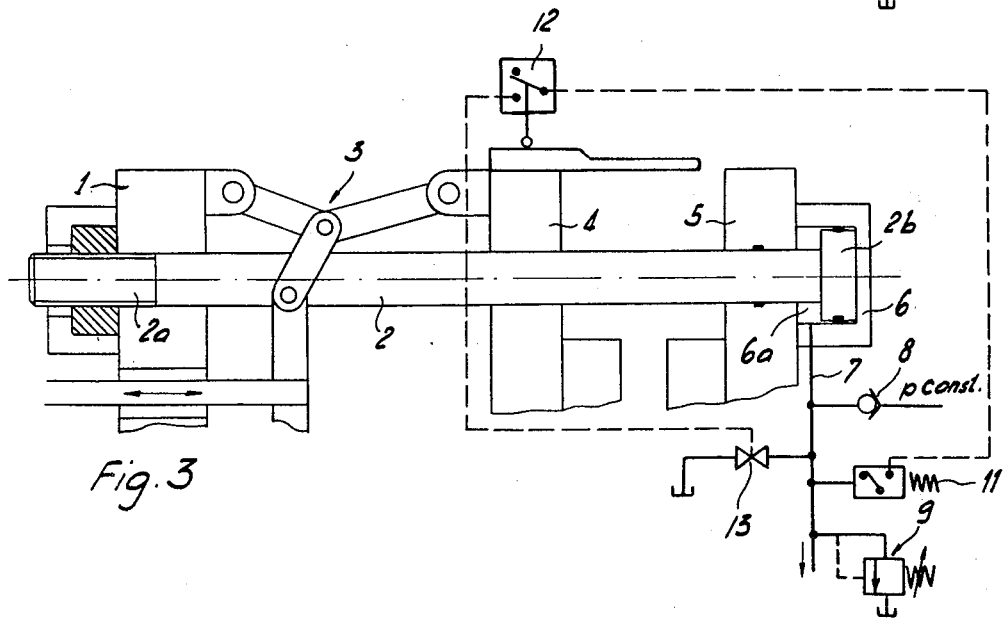
FIG. 3 is a view, similar to FIG. 1, illustrating a variation of the embodiment shown in FIG. 1 and comprising a pressure control device.

The embodiment according to FIG. 3, otherwise corresponding to that of FIG. 1, is provided with a device for continuously controlling the pressure of the pressure cushions to prevent a building up of the full locking pressure if, for example, the mold closing motion is hindered by foreign bodies getting caught between the mold halves. An automatic pressure controller 11 is connected to line 7 and comprises a switch of a safety circuit. Another switch 12 of this circuit is associated with mobile mold support 4. The safety circuit serves to actuate an outlet valve 13 mounted in pressure line 7.

If the mold is closed under normal conditions, not only is the switch in pressure controller 11 actuated by the pressure increase in the pressure cushions but, at the same time and due to the reaching of the correct locking position, switch 12 is actuated so that outlet valve 13 remains closed and the high pressure determined by valve 9 can be produced in the pressure cushions. If, on the contrary, a foreign body gets caught between the mold halves, the pressure in the pressure cushions increases already before attaining the mold closing position. Thus, only switch 11 is actuated while switch 12, whose actuation depends on the position of mold support 4, cannot be actuated. This results in the opening of outlet valve 13 whereby the pressure in line 7 is released and a building up of the full locking pressure is prevented.

The described devices are simple in construction and easy to maintain and insure at any time a uniform and shock-free loading of the component parts.

While specific embodiments of the invention have been shown and described in detail to illustrate the application of the principles of the invention, it will be understood that the invention may be embodied otherwise without departing from such principles.

What is claimed is:

1. A tool locking device with tie rods, particularly for plastics injection molding machines, comprising, in combination, a first tool support movable along said tie rods; a locking mechanism bearing against first ends of said tie rods; a second tool support mounted on said tie rods adjacent the opposite ends thereof; said locking mechanism being connected to said first tool support and operable to lock said first tool support in closing relation with said second tool support; means forming respective hydraulic cushions between said second tool support and said opposite ends of said tie rods; a common connection line connected to all of said hydraulic cushions and establishing intercommunication therebetween; hydraulic pressure limiting means connected to said common connection line; a fluid outlet valve connected to said common connection line; a pressure controller connected to said common connection line; a first switch actuated by said pressure controller responsive to a predetermined increase in pressure in said hydraulic cushions; a second switch actuated by said first tool support responsive only to said first tool support reaching the correct locking position; and a circuit interconnecting said first and second switches and said fluid outlet valve; said fluid outlet valve being closed only responsive to actuation of both said first and said second switches.

2. A tool locking device for tie rods, as claimed in claim 1, in which said first and second switches are connected in series in said circuit.

3. A tool locking device for tie rods, as claimed in claim 1, including a check valve connecting said common connection line with a constant pressure source of hydraulic fluid.

4. A tool locking device for tie rods, as claimed in claim 1, in which said hydraulic pressure limiting means comprises a pressure relief valve.

* * * * *